(12) United States Patent
Ono et al.

(10) Patent No.: US 6,273,612 B1
(45) Date of Patent: Aug. 14, 2001

(54) SLIDING BEARING

(75) Inventors: Akira Ono; Koichi Yamamoto; Hiroshi Yoshimi; Nobutaka Hiramatsu; Takayuki Shibayama, all of Nagoya (JP)

(73) Assignee: Daido Metal Company Ltd, Nagoya (JP)

( * ) Notice: Subject to any disclaimer, the term of this patent is extended or adjusted under 35 U.S.C. 154(b) by 0 days.

(21) Appl. No.: 09/340,169

(22) Filed: Jun. 28, 1999

(30) Foreign Application Priority Data

Jun. 29, 1998 (JP) .................................................. 10-182687

(51) Int. Cl.$^7$ ...................................................... F16C 33/04
(52) U.S. Cl. ............................ 384/276; 384/294; 384/297
(58) Field of Search ..................................... 384/275, 288, 384/294, 297, 299, 300, 317

(56) References Cited

U.S. PATENT DOCUMENTS

| 4,872,248 | * | 10/1989 | Roemer et al. | 384/273 |
| 4,889,435 | * | 12/1989 | Gojon | 384/276 |

FOREIGN PATENT DOCUMENTS

| 2209566 | 5/1989 | (GB) . |
| 2324838 | 11/1998 | (GB) . |

\* cited by examiner

*Primary Examiner*—Lenard A. Footland
(74) *Attorney, Agent, or Firm*—Browdy and Neimark (57) ABSTRACT

Disclosed is a sliding bearing in which a heat emission property of the sliding bearing is improved without affecting the original function of an overlay layer. An overlay layer is formed on a higher load-side bearing half, and extends circumferentially from a central portion thereof toward each of opposite ends thereof. Any overlay layer is not formed on a lower load-side bearing half, so that a bearing alloy remains exposed to the surface of this bearing half.

7 Claims, 9 Drawing Sheets

SLIDING BEARING

BACKGROUND OF THE INVENTION

This invention relates to a sliding bearing having an overlay layer, and more particularly to a sliding bearing having an improved heat emission property.

A sliding bearing, used, for example, for bearing a crankshaft or a crank pin of an engine, has an overlay layer of a uniform thickness formed on a bearing surface, made of a bearing alloy such as an Al alloy or a Cu alloy, over an entire circumference thereof. Such an overlay layer is made of a soft alloy, such as a Sn base alloy, a Pb base alloy, an Al base alloy, or a resin material. The overlay layer is formed in order to provide the bearing alloy with properties of conformability, foreign matter embeddability and anti-seizure property with respect to a mating shaft.

Lubricating oil is supplied to a sliding bearing, which serves to prevent a solid to solid contact between the bearing and the mating shaft and also has a function of transmitting heat generated during operation, that is, the function of cooling the bearing contact portion.

While the bearing contact portion is thus cooled by the lubricating oil, the sliding bearing itself is also required to have a function of heat emission to the outside. However, in the conventional sliding bearing, the above-mentioned overlay layer of a uniform thickness is formed over the entire circumference thereof, and particularly where the overlay layer is made of a resin material, heat is less liable to emit to the outside through the sliding bearing since the overlay layer has a low thermal conductivity, and therefore there has been encountered a problem that heat emission through the sliding bearing can not be effected adequately.

SUMMARY OF THE INVENTION

Thus, it is an object of the invention to provide a sliding bearing with an overlay layer, which has an excellent heat emission property.

In the conventional sliding bearings, an overlay layer, having a uniform thickness of about 3 to 20 µm, is formed on the bearing over the entire circumference thereof. With regard to improvement of the thickness and a material type of the conventional overlay layer, various efforts have been made to maintain its initial properties. The conventional sliding bearings have depended for the cooling on lubricating oil, and effective measures for promoting heat emission from the bearing structure have not been taken sufficiently.

In the sliding bearing of the present invention, having such a technical background, an overlay layer is improved so as to promote the heat emission property of the sliding bearing without affecting the original function of the overlay layer.

According to the invention, there is provided a sliding bearing wherein a load, applied to a bearing alloy surface adapted in a cylindrical shape, varies in a circumferential direction;

wherein an overlay layer is formed on a portion of the bearing alloy surface to which a higher load is applied; and wherein a thickness of the higher load-side overlay layer decreases gradually from the central portion thereof toward both circumferential outward directions.

In the construction in which the thickness of the higher load-side overlay layer decreases gradually from the central portion thereof toward the opposite circumferential ends thereof, since the amount of heat, transmitted to the bearing alloy through the thin portions of the overlay layer, is greater, the amount of heat radiated to environment through the sliding bearing increases even if the overlay layer is present. The situation is the same as above also in the case of no overlay layer in the circumferential end regions.

The conformability and anti-seizure property of the overlay layer with respect to the mating shaft do not need to be uniform and high enough over the entire circumference. Namely, if that portion of the bearing alloy, to which a high load is applied, does not have sufficient original properties, it is necessary to form the overlay layer on this portion so as to enhance the properties, whereas those portions of the bearing alloy, to which a small load is applied, exhibit the sufficient original properties. Under the circumstances, in the above constructions, the overlay layer is provided on that portion of the bearing alloy surface to which a high load is applied, and therefore the conformability and anti-seizure property of the overlay layer (which are the functions to be originally achieved by the overlay layer) for the mating shaft are by no means inferior to those of the conventional sliding bearing.

According to one feature of the invention, a region of formation of the higher load-side overlay layer extends circumferentially from the central portion toward both circumferential directions in an angle range of 30 to 80 degrees so that the region includes a main load-supporting portion to which a highest load is applied.

For example, in the case of a diesel engine for an automobile, a main load-supporting portion of a sliding bearing for supporting a crankshaft or a crank pin extends circumferentially over an angle of about 30 degrees, and such angle for a gasoline engine is larger than it. Therefore, according to the above feature, the main load-supporting portion, required to have improved properties including the conformability and the anti-seizure property, is covered with the overlay layer.

According to another feature of the invention, a region of formation of the higher load-side overlay layer extends circumferentially from the central portion toward each of the circumferential directions in an angle range of 80 to 90 degrees so that the region includes a main load-supporting portion to which a highest load is applied, and the thickness of the higher load-side overlay layer decreases gradually from the central portion thereof toward each of the circumferential directions in an angle range of 30 to 70 degrees, and the thickness of each of the residual portions of the overlay layer other than the thickness-decreasing portion, the residual portions extending circumferentially outwardly from the thickness-decreasing portion, is uniform or increases gradually toward the circumferential outward direction.

The thickness of the overlay layer, disposed outwardly of the overlay layer extending circumferentially from the central portion toward each of the opposite ends in the range of 30 to 70 degrees, is uniform or is increasing gradually toward the opposite circumferential ends. Therefore, for example, in the sliding bearing comprising two bearing halves assembled together, even if the circumferential ends are shifted with respect to each other, premature fatigue of the bearing alloy due to a localized contact of the shifted ends with the mating shaft can be prevented.

According to still another feature of the invention, the higher load-side overlay layer at the circumferential central portion has a largest thickness at the respective opposite axial end portions in an axial direction of the bearing.

At an initial stage of use of the sliding bearing, the mating shaft tends to contact the both opposite axial end portions of the bearing surface in a localized manner. Therefore, the thickness of the overlay layer is increased at the opposite axial end portions, and thereby, the conformability of the opposite end portions can be improved.

According to a further feature of the invention, the higher load-side overlay layer, extending over a circumferential angle range of 30 to 70 degrees from the circumferential central portion toward each of the circumferential directions, has a largest thickness at the respective opposite axial end portions in an axial direction of the bearing, and the respective residual portions extending circumferentially outwardly from the circumferential central region decreases gradually toward the axial end portion of the bearing.

The sliding bearing, comprising two bearing halves assembled together, is used, for example, in an engine of an automobile, and when the bearing halves are pushed hard against each other, the central portion of the bearing half in the axial direction may be inwardly deformed or depressed at the opposite circumferential end portions of the bearing half. If such depression develops, the thickness of the overlay layer in the axial direction is decreasing gradually toward the opposite axial ends at those portions of the overlay layer disposed circumferentially outwardly of that portion extending circumferentially from the central portion toward each of the opposite ends in the range of 30 to 70 degrees, and thereby, the conformability for the mating shaft can be maintained at the inwardly-depressed portions, and the heat emission effect is increasing toward the opposite axial ends.

According to a still further feature of the invention, the higher load-side overlay layer is made of a resin material containing a solid lubricant and a resin binder.

The overlay layer is made of the resin material, and thereby, the lubricating property for the mating shaft is enhanced because of the presence of the solid lubricant, so that seizure is less liable to occur.

According to a still another feature of the invention, the higher load-side overlay layer, extending over a circumferential angle range of 30 to 70 degrees from the circumferential central portion, is made of a resin material containing a solid lubricant and a resin binder, and the respective residual portions extending circumferentially outwardly from the circumferential central region is made only of a resin, or the resin material whose solid lubricant content is lower than that of the former resin material in the circumferential central region.

In this construction, the overlay layer has those portions, containing no solid lubricant, or those portions containing a small amount of solid lubricant. Therefore, the strength of bonding of the overlay layer to the bearing alloy is improved.

According to still another feature of the invention, the higher load-side overlay layer is made of a resin material containing a solid lubricant and a resin binder, and the content of the solid lubricant in the resin material is the highest at the central portion and decreases gradually toward circumferentially outwardly from the central portion.

In this construction, the amount of the solid lubricant is varied in accordance with the required degree of lubricating property, and therefore the amount of the solid lubricant can be suppressed to a minimum, so that the bonding strength between the overlay and the bearing alloy layers is improved.

According to a further feature of the invention, the higher load-side overlay layer is made of a resin material containing a solid lubricant and a resin binder, and fine pits are formed on the surface of the overlay layer by a running-in.

In this construction, lubricating oil and various metal particles of the components of the bearing alloy, are caught in the pits, so that the anti-seizure property is improved.

BRIEF DESCRIPTION OF THE DRAWINGS

FIGS. 12(a) and 12(b) are cross-sectional views respectively showing conditions before and after running-in.

DESCRIPTION OF THE PREFERRED EMBODIMENTS

A preferred embodiment of a sliding bearing of the invention, provided at a larger end portion of a connecting rod of an automobile engine, will be described.

Figure 1:
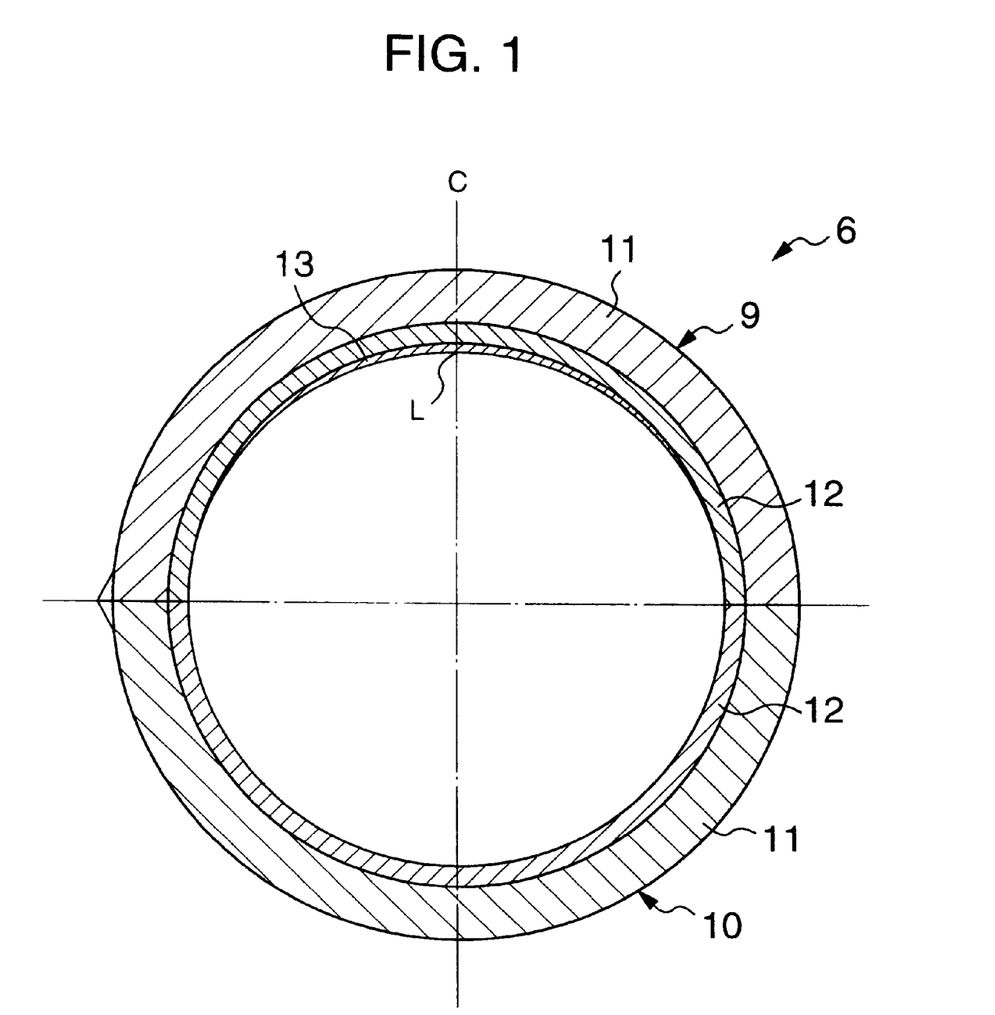
FIG. 1 is a cross-sectional view of a first embodiment of a sliding bearing of the invention.
Figure 2:
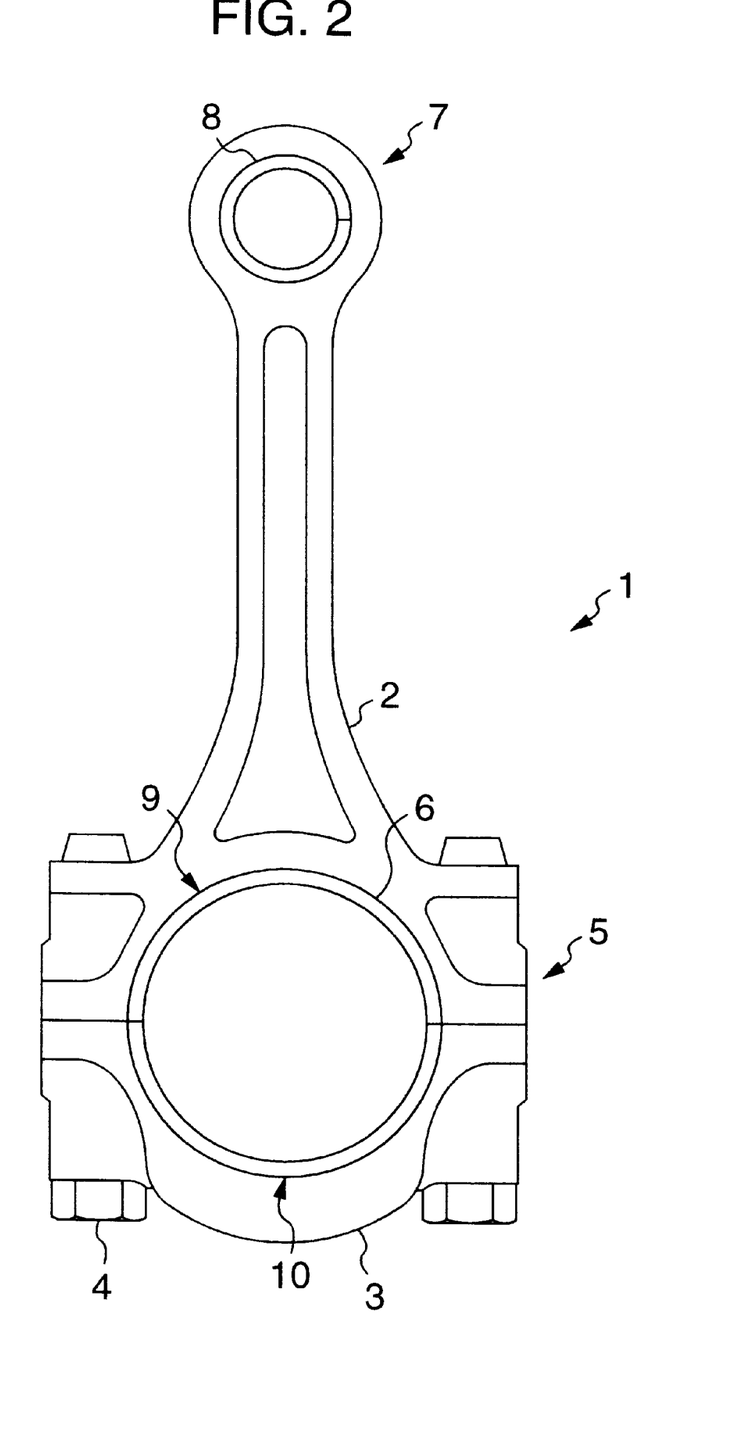
FIG. 2 is a front-elevational view of a connecting rod.

FIGS. 1 and 2 show a first embodiment of the invention. As shown in FIG. 2, the connecting rod 1 comprises a rod body 2, and a cap 3 fixedly secured to one end portion of the rod body 2 by bolts 4. The larger end portion 5 of the connecting rod 1 is formed by the one end portion of the rod body 2 and the cap 3, and the sliding bearing 6 is mounted at the larger end portion 5 which serves as a housing for this sliding bearing 6. A sliding bearing 8 of the wrapped bushing-type is fitted in a smaller end portion 7 of the connecting rod 1, and a piston pin (not shown), connected to a piston, is borne by this sliding bearing 8.

The sliding bearing 6, provided at the larger end portion 5, is adapted to bear a crank pin (not shown) of a crankshaft, and comprises two bearing halves 9 and 10 assembled together. As shown in FIG. 1, each of these bearing halves 9 and 10 comprises a bimetal of a hemi-cylindrical shape which comprises a backing metal 11, made for example of steel, and a bearing alloy 12, such as an Al alloy and a Cu alloy, bonded to the backing metal 11.

The sliding bearing 6, provided at the larger end portion 5, functions to transmit an explosion force of a combustion chamber, transmitted to the connecting rod 1 through the piston pin, to the crank pin. Therefore, the direction and magnitude of a load, applied to the bearing surface of the sliding bearing 6, varies in the circumferential direction, and the bearing half 9, disposed at the rod body 2 so as to transmit the explosion force of the combustion chamber to the crank pin, undergoes a larger load than the bearing half 10, disposed at the cap 3, undergoes.

The cylindrical bearing surface is formed by the surfaces of the bearing alloys 12 of the two bearing halves 9 and 10, and an overlay layer 13 is formed on the hemi-cylindrical bearing surface of the higher load-side bearing half 9. The overlay layer 13 is made of a soft alloy, such as a Sn base alloy, a Pb base alloy and an Al base alloy, or a resin material. On the other hand, any overlay layer is not formed on the hemi-cylindrical bearing surface defined by the bearing alloy 12 of the lower load-side bearing half 10, so that the bearing alloy 12 remains intact.

The overlay layer 13, formed on the bearing half 9, extends circumferentially from a central portion thereof (indicated by a dot-and-dash line C in FIG. 1) toward each of opposite ends thereof in the range of 90 degrees, that is, the overlay layer 13 is formed over the entire area of the bearing surface of the bearing half 9. The thickness of the overlay layer 13 is the largest at the central portion in the circumferential direction, and is decreasing gradually from the central portion toward the opposite ends in the circumferential direction. That portion of the central portion, at which the thickness is the largest, is a main load-supporting portion L which is subjected to the highest load among the loads applied to the bearing surface of the bearing half 9. The thickness of the backing meal 11 is about 1.2 mm. The thickness of the bearing alloy 12 is about 0.3 mm. The thickness of the thickest portion of the overlay layer 13 at the central portion is about 10 $\mu$m. The overlay layer 13 is flush with the bearing alloy 12 at the opposite circumferential ends of the bearing half 9.

In the sliding bearing 6 of this embodiment, the overlay layer 13 is thus formed on the higher load-side bearing half 9 which is required to make up the conformability, the anti-seizure property and so on which the bearing alloy 12 should originally possess for the crank pin. And besides, the overlay layer 13 has the largest thickness at the main load-supporting portion L (the central portion in the circumferential direction) to which the highest load is applied. Therefore, the sliding bearing of this embodiment is by no means inferior in the properties (including the conformability and the anti-seizure property) to the conventional sliding bearing in which an overlay layer of a uniform thickness is formed on a bearing surface over an entire circumference thereof.

The overlay layer 13, formed on the bearing surface of the bearing half 9, is decreasing in thickness gradually from the central portion toward the opposite ends in the circumferential direction. Therefore, even if the overlay layer 13 is made of a resin material with a low thermal conductivity, the amount of heat, transmitted to the bearing alloy 12 through the overlay layer 13, is large if the overlay layer 13 is thin. Therefore, the heat, produced during the operation of the engine, is easily transmitted from the thinned portion of the overlay layer 13 to the connecting rod 1 through the bearing alloy 12 and the backing metal 9, and the heat emission property of the bearing half 9 and hence the heat emission property of the sliding bearing 6 are enhanced.

Particularly in this embodiment, any overlay layer is not formed on the lower load-side bearing half 10 disposed at the cap 3, and the surface of the bearing alloy 12 defines the bearing surface. Therefore, the amount of the heat, transmitted from the bearing alloy 12 to the connecting rod 1 through the backing metal 11, is larger, so that the overall heat emission property of the sliding bearing 6 is further enhanced.

Figure 3:
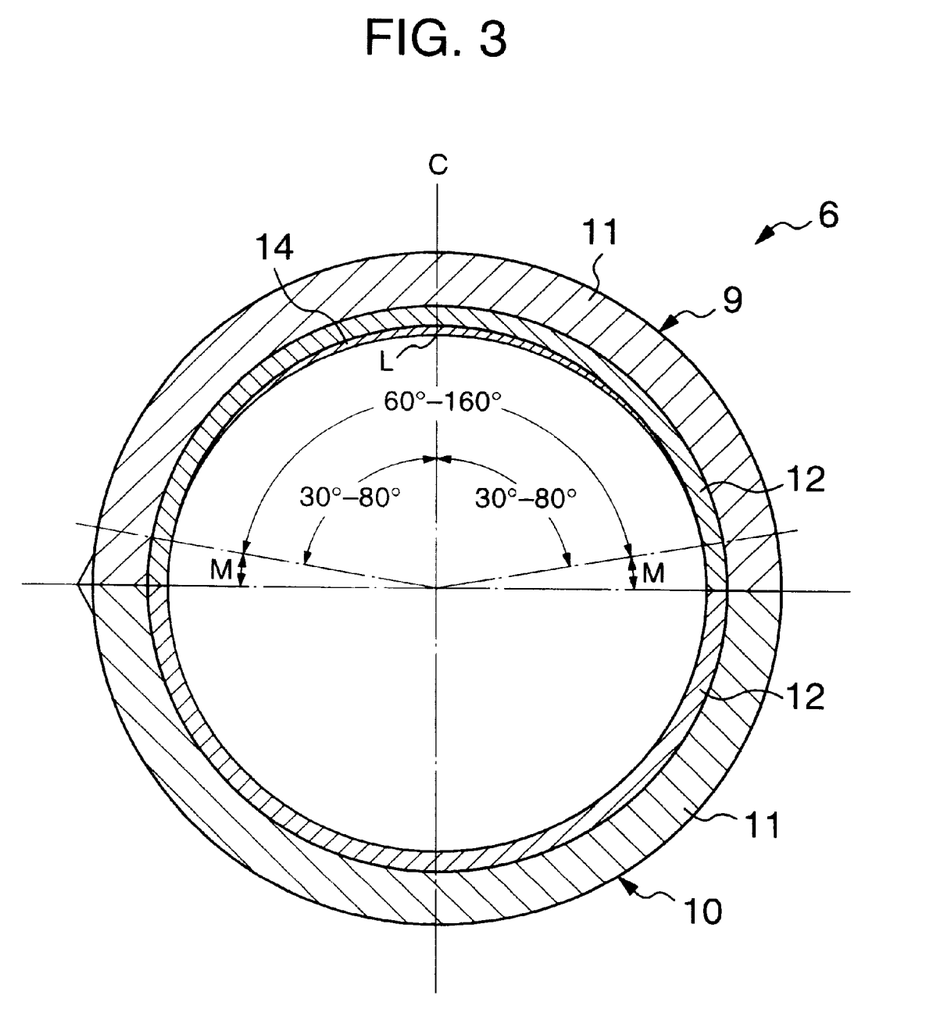
FIG. 3 is a view similar to FIG. 1, but showing a second embodiment of the invention.

FIG. 3 shows a second embodiment of the present invention. This embodiment differs from the first embodiment in that a higher load-side overlay layer 14, formed on a bearing half 9 disposed at the rod body 2, is not formed on an entire bearing surface of the bearing half 9, but is formed on a predetermined portion of the bearing surface of the bearing half 9, so that there are provided portions M where a bearing alloy 12 is exposed to the surface of the bearing half 9.

Namely, the overlay layer 14 is formed on the bearing surface of the bearing half 9, and extends circumferentially from a central portion thereof toward each of opposite ends thereof in the range of 30 to 80 degrees, that is, extends over an angle of 60 to 160 degrees. The thickness of the higher load-side overlay layer 14 is the largest (about 10 $\mu$m) at a main load-supporting portion L at the central portion, and is decreasing gradually from the central portion toward the opposites ends.

In the case of a diesel engine, the area of the bearing half 9, to which a high load is applied, extends over an angle of about 60 degrees, and in the case of a gasoline engine, the angle of this area is a little larger than that for the diesel engine. Therefore, if the overlay layer 14 is formed to extend circumferentially from the central portion toward each of the opposite ends in the range of 30 to 80 degrees, that is, to extend over an angle of 60 to 160 degrees as in this embodiment, the overlay layer 14 is provided at that area of the sliding bearing where the properties, including the conformability, need to be improved. Therefore, the sliding bearing of this embodiment exhibits excellent properties which are by no means inferior to those of the conventional sliding bearing, and besides the bearing half 9 itself has the portions M where the bearing alloy 12 is exposed to the surface of this bearing half 9, so that the bearing half 9 has a more excellent heat emission property.

In the case where the higher load-side bearing half 9 is constructed as in this second embodiment, an overlay layer, having an uniform thickness of about 20 $\mu$m, may be formed on a bearing surface of a lower load-side bearing half 10. In this construction, the heat can be emitted efficiently because of the provision of the portions M, and the lubricating properties such as the conformability and the anti-seizure property, are further improved.

Figure 4:
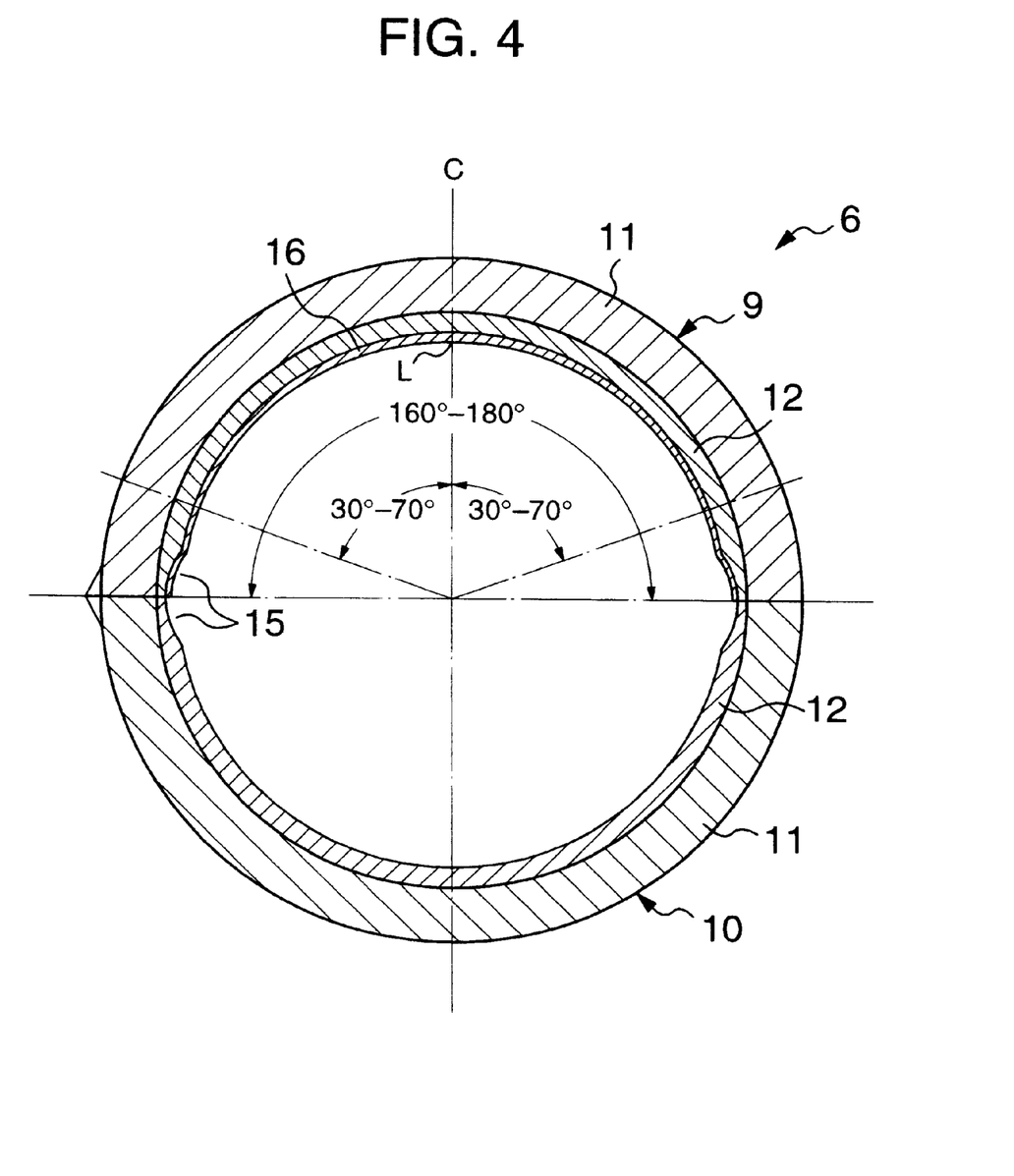
FIG. 4 is a view similar to FIG. 1, but showing a third embodiment of the invention.
Figure 5:
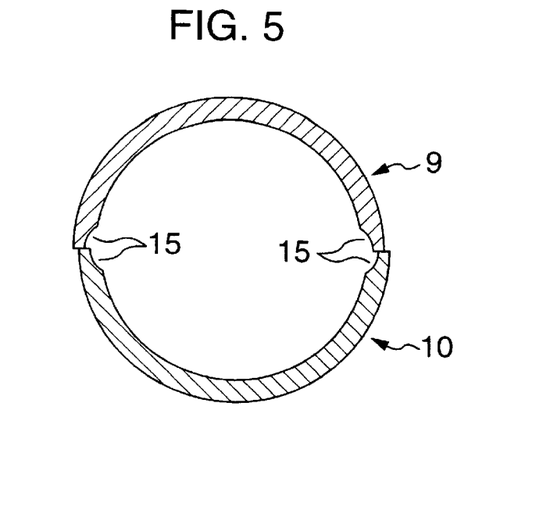
FIG. 5 is a cross-sectional view explanatory of the function of a crush relief.

FIGS. 4 and 5 show a third embodiment of the invention. In this embodiment, arcuate recesses (hereinafter referred to as "crush relief") 15 are formed respectively in opposite circumferential end portions of a bearing surface of each of bearing halves 9 and 10. If the circumferential ends of the bearing halves 9 and 10 are shifted with respect to each other in a radial direction as shown in FIG. 5 when the bearing halves 9 and 10 are mounted on the connecting rod 1, the crush relieves 15 function to prevent the crank pin from being held hard against these shifted ends in a localized manner, thereby preventing a premature fatigue of a bearing alloy 12 so as to prevent the separation of the bearing alloy.

Thus, each of the bearing halves 9 and 10 has the crush relieves 15, and a higher load-side overlay layer 16 is formed on the bearing surface of the bearing half 9, and extends circumferentially from a central portion thereof toward each of opposite ends thereof in the range of 80 to 90 degrees. The thickness of the higher load-side overlay layer 16 is decreasing gradually from a main load-supporting portion toward each of the opposite circumferential ends in the range of 30 to 70 degrees, and the other portions of the overlay layer 16, extending circumferentially outwardly respectively from the opposite ends of this thickness-decreasing portion, have a uniform thickness equal to the thickness of the opposite ends of the thickness-decreasing portion.

In this embodiment of the above construction, the opposite side portions of the higher load-side overlay layer 16 have a relatively small thickness, and therefore the bearing half 9 itself has an excellent heat emission property. And besides, at least the boundary portion between the bearing surface and each crush relief 15 is covered with the relatively-thin portion of the overlay layer 16, and therefore if the crank pin contacts the boundary portion between the bearing surface and the crush relief 15 in a localized manner, the conformability is enhanced by this overlay layer 16.

Figure 6:
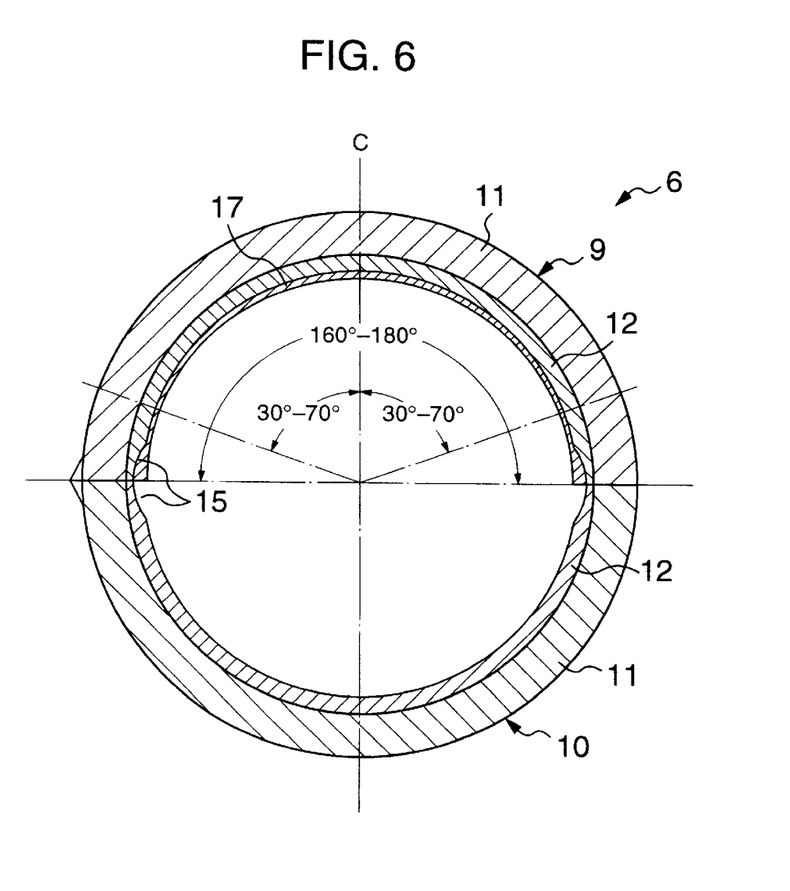
FIG. 6 is a view similar to FIG. 1, but showing a fourth embodiment of the invention.

FIG. 6 shows a fourth embodiment of the present invention. This embodiment differs from the third embodiment in that those portions of an overlay layer 17, disposed respectively in crush relieves 15, are increasing in thickness gradually toward opposite circumferential ends thereof, respectively. Namely, the thickness of the opposite end portions of the overlay layer 17 increases gradually in accordance with the gradually-increasing depth of the crush relief 15, thereby forming a cylindrical surface.

With this construction, the embeddability is more improved by the thick portions of the overlay layer disposed respectively in the crush relieves 15.

Figure 7:
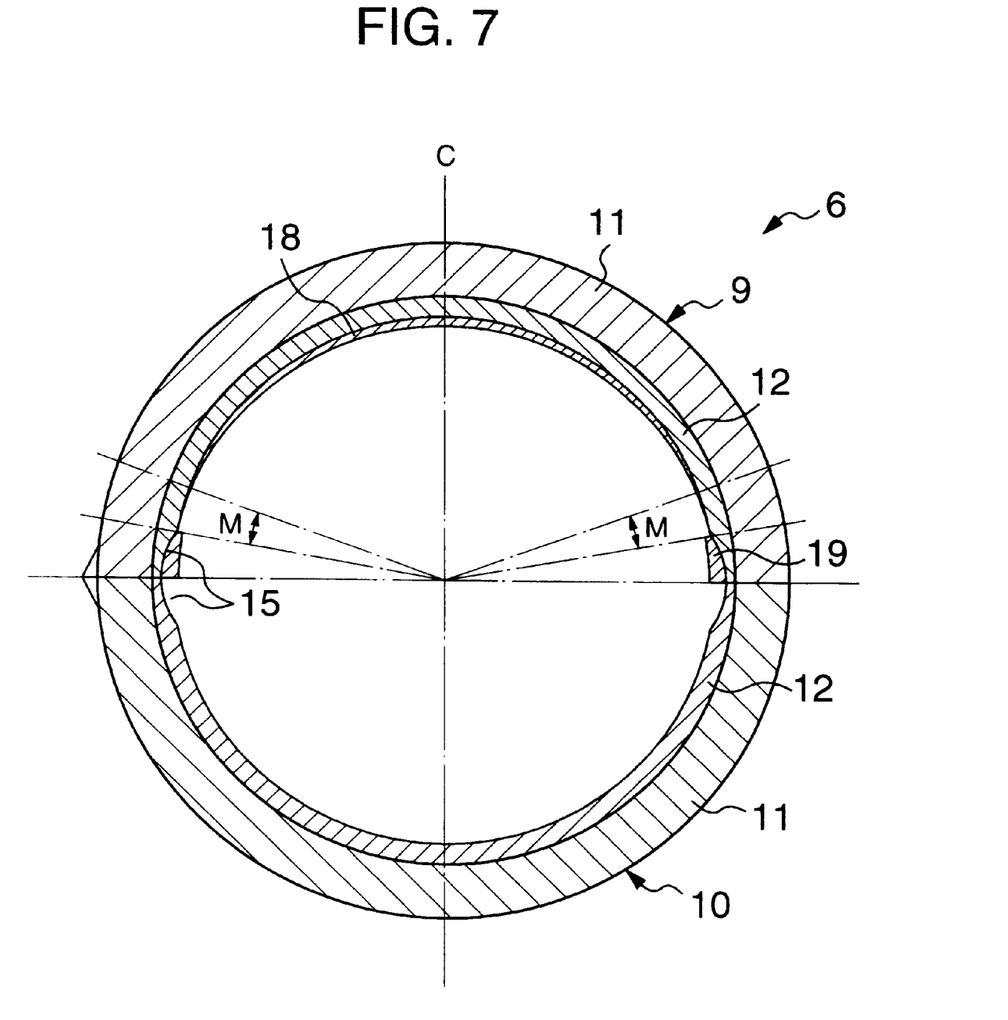
FIG. 7 is a view similar to FIG. 1, but showing a fifth embodiment of the invention.

FIG. 7 shows a fifth embodiment of the present invention. This embodiment differs from the fourth embodiment in that an exposed portion, at which a bearing alloy 12 is exposed, is provided between each of opposite ends of a high load-side overlay layer 18 (which is decreasing in thickness gradually from the central portion toward the opposite ends) and an overlay layer 19 provided in a corresponding crush relief 15.

With this construction, the heat emission property of the bearing half 9 is further improved.

Figure 8:
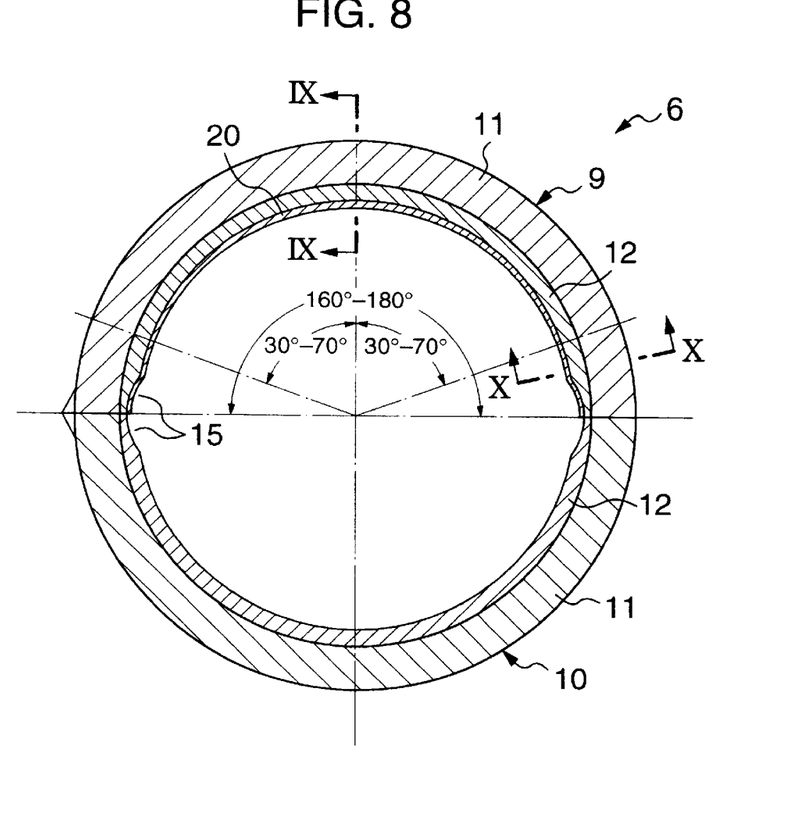
FIG. 8 is a view similar to FIG. 1, but showing a sixth embodiment of the invention.
Figure 9:
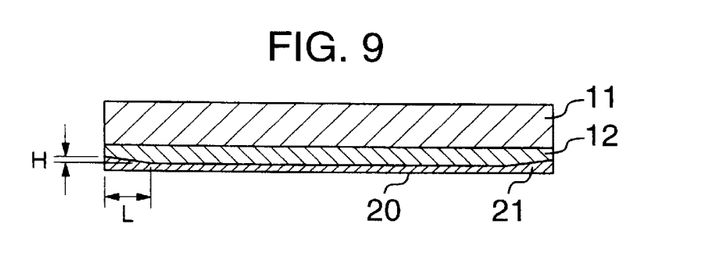
FIG. 9 is cross-sectional view taken along the line IX—IX of FIG. 8.
Figure 10:
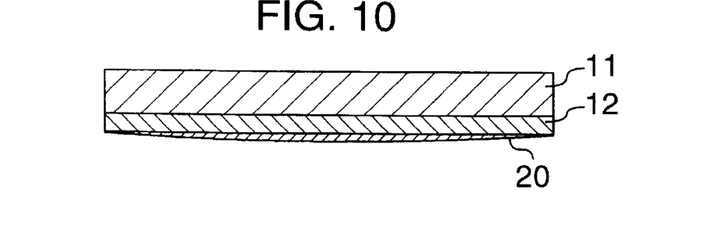
FIG. 10 is a cross-sectional view taken along the line X—X of FIG. 8.

FIGS. 8 to 10 show a sixth embodiment of the invention. This embodiment is similar to the third embodiment in that a high load-side overlay layer 20 is formed on a bearing surface of a bearing half 9, and extends circumferentially from a central portion thereof toward each of opposite ends thereof in the range of 80 to 90 degrees. The thickness of the higher load-side overlay layer 20 is decreasing gradually from a main load-supporting portion toward each of the opposite circumferential ends in the range of 30 to 70 degrees, and the other portions of the overlay layer 20, extending circumferentially outwardly respectively from the opposite ends of this thickness-decreasing portion, have a uniform thickness equal to the thickness of the opposite ends of the thickness-decreasing portion.

In this sixth embodiment, at that portion of the bearing half 9 extending circumferentially from the central portion toward each of the opposite ends in the range of 30 to 70 degrees, a gently-slanting crowning 21 is formed at each of opposite axial end portions of a bearing alloy 12 as shown in FIG. 9. The crowning 21 has a length L of 3 to 10 mm and a height H (between the inner and outer ends of the crowning in the radial direction) of 5 to 20 µm.

That portion of the overlay layer 20, formed on each crowning 21, has a surface which is even in the axial direction. Therefore, at that portion of the bearing half 9 extending circumferentially from the central portion toward each of the opposite ends in the range of 30 to 70 degrees, the axial opposite end portions of the overlay layer 20 are the thickest. Each crowning 21 may be formed by an arcuate surface.

As shown in FIG. 10, at the opposite circumferential end portions of the bearing half 9, the thickness of the overlay layer 20 in the axial direction is decreasing gradually toward the opposite axial ends thereof.

Incidentally, at an initial stage of the operation at which the sliding bearing 6 has not yet conformed to the crank pin, the crank pin tends to contact the opposite axial end portions of the sliding bearing 6 in a localized manner. When such localized contact occurs, the pressure of an oil film, formed between the sliding bearing 6 and the crank pin, becomes higher at the opposite axial end portions than at the central portion, so that the oil film is thinned at the opposite axial end portions.

In such a condition, the oil film is broken at the opposite axial end portions particularly at that portion of the slide bearing to which a high load is applied. As a result, the crank pin comes into direct contact with the overlay layer, and the overlay layer is subjected to premature wear, and finally the bearing alloy comes into direct contact with the crank pin, and is worn off.

On the other hand, in this embodiment, at that portion of the sliding bearing to which a high load is applied, that is, at that portion extending circumferentially from the central portion toward each of the opposite ends in the range of 30 to 70 degrees, the overlay layer 20 is the thickest at the opposite axial end portions, and therefore these thickened portions of the overlay layer 20 can be deflected easily. Therefore, the crank pin contacts the opposite axial end portions in a localized manner, so that the thickened portions of the overlay layer 20 soon become conformed to the crank pin When the cap 3 is fastened to the rod body 2 by the bolts 4, the bearing halves 9 and 10 are pressed hard against each other, and at the opposite circumferential end portions of the bearing half, the opposite axial end portions, on which the tightening force for the bolts 4 acts directly, bulge inwardly. In this embodiment, at the opposite circumferential end portions of the bearing half 9, the thickness of the overlay layer 20 in the axial direction is decreasing gradually toward the opposite axial ends. Therefore, the conformability for the crank pin can be maintained at the inwardly-bulged portions, and the heat emission ability is increasing toward the opposite axial ends.

Figure 11:
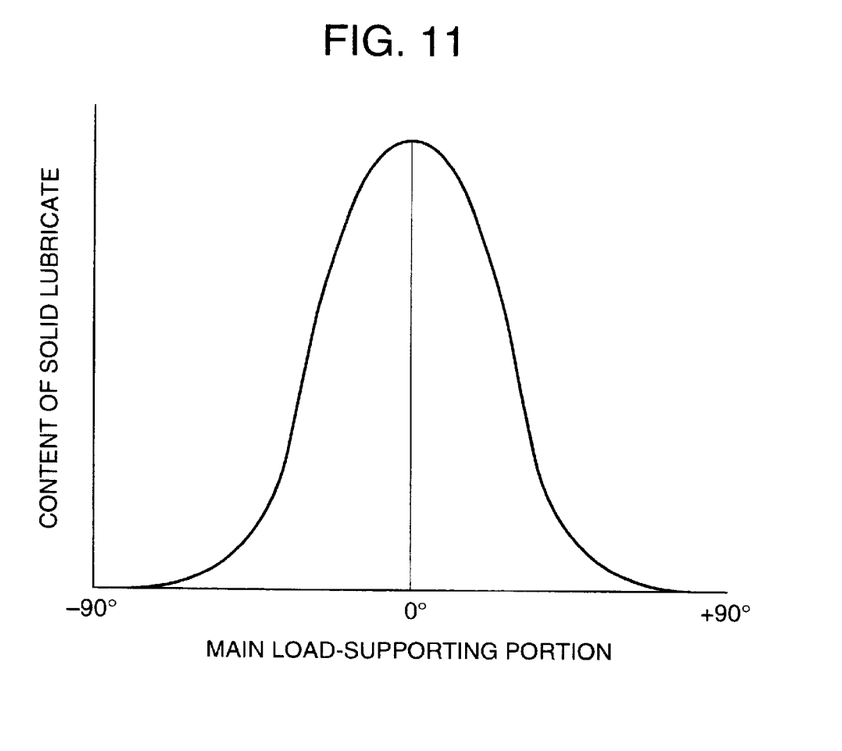
FIG. 11 is a diagram showing the solid lubricant content of an overlay layer in a seventh embodiment of the invention.
Figure 12:
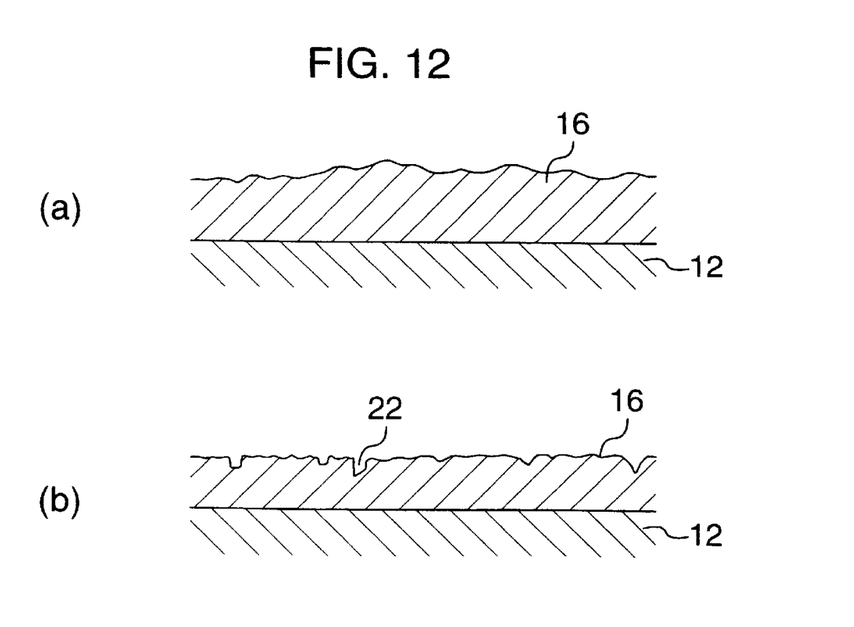

FIGS. 11 and 12 show a seventh embodiment of the invention. In this embodiment, as in the third embodiment, an overlay layer 16 is formed on a bearing surface of a bearing half 9, and extends circumferentially from a central portion thereof toward each of opposite ends thereof in the range of 80 to 90 degrees, and the thickness of the overlay layer 16 is decreasing gradually from a main load-supporting portion toward each of the opposite circumferential ends in the range of 30 to 70 degrees, and the other portions of the overlay layer 16, extending circumferentially outwardly respectively from the opposite ends of this thickness-decreasing portion, have a uniform thickness equal to the thickness of the opposite ends of the thickness-decreasing portion.

In this embodiment, the overlay layer 16 is made of a resin material. For example, this resin material is formed by mixing fine grains of solid lubricant (such as molybdenum disulfide and graphite), a membranaceous-improving agent, a reinforcing agent (such as fibers) with a resin binder.

In this embodiment, the content of the solid lubricant varies in the direction of the circumference of the bearing half 9. More specifically, as shown in FIG. 11, the content of the solid lubricant is the highest at the main load-supporting portion (central portion), and is decreasing gradually from the central portion toward the opposite circumferential ends, and the content of the solid lubricant at the opposite axial end portions is zero, that is, the opposite axial end portions of the overlay layer comprises only the resin.

The overlay layer 16 is thus composed of the resin material containing the solid lubricant, and with this construction, the lubricating ability of the sliding bearing for the crank pin is enhanced because of the presence of the solid lubricant, and seizure is less liable to occur.

In this embodiment, the content of the solid lubricant is decreasing gradually from the central portion toward the opposite circumferential ends. With this construction, that portion of the overlay layer, subjected to a higher load, contains a larger amount of solid lubricant, and therefore there is achieved the effect of enhancing the lubricating properties while suppressing the amount of the solid lubricant to a minimum.

Before the running-in, the surface of the overlay layer 16 is as shown in FIG. 12(a). When the running-in is effected, the surface of the overlay layer becomes conformed to the crank pin, and becomes even in the axial direction. At this time, part of the solid lubricant and part of the reinforcing agent (such as fibers) are removed from the resin binder in the overlay layer 16 of the resin material, so that fine pits 22 of irregular shape, having a maximum length, for example, of about 0.1 mm, are formed in the surface of the overlay layer 16. Then, lubricating oil is filled in these pits 22, and also carbon, which is the combustion product, and particles (produced as a result of wear) of Zn, Fe, Sn, Pb, Cu, Sb, In, Mn, Al, P and so on, which are the components of the bearing alloy 12, are caught in the pits 22, and these serve as lubricant, thereby improving the lubricating properties when staring the engine.

The present invention is not limited to the embodiments described above and shown in the drawings, and the following modifications can be made.

The main load-supporting portion L, to which the highest load is applied, does not need to be disposed at the central portion of the bearing half 9 in the circumferential direction, but may be offset toward one of the opposite circumferential ends.

Figure 13:
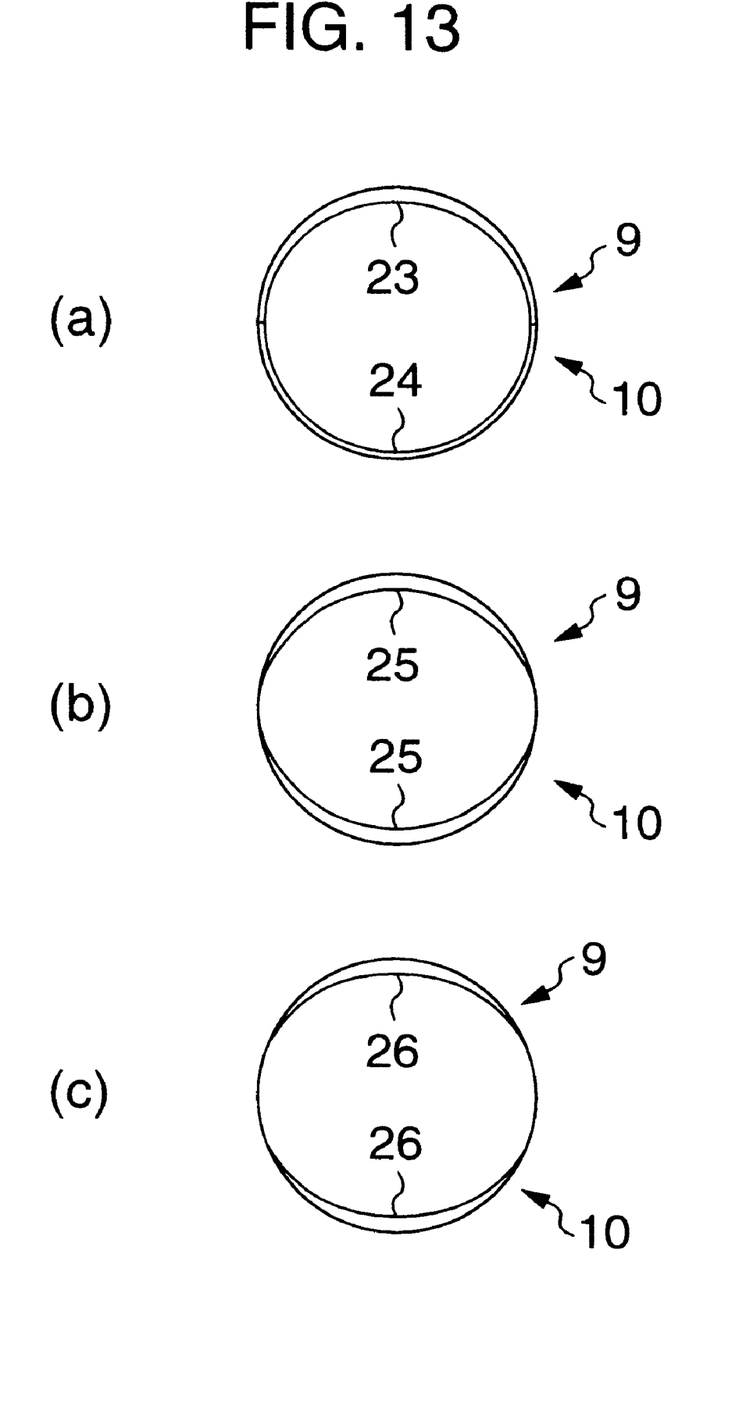
FIGS. 13(a) to 13(c) are schematic views showing modified sliding bearings of the invention, respectively.

In one modified form of the invention shown in FIG. 13(a), an overlay layer 23 is formed on a higher load-side bearing half 9, and is decreasing in thickness gradually from a central portion thereof toward opposite circumferential ends. An overlay layer 24, having a uniform thickness equal to the thickness of the thinnest portions of the high load-side overlay layer 23, is formed on a lower load-side bearing half 10 over an entire area thereof.

In another modified form of the invention shown in FIG. 13(b), an overlay layer 25 is formed on a higher load-side bearing half 9, and is decreasing in thickness gradually from a central portion thereof toward opposite circumferential ends. A lower load-side bearing half 10 has the same construction as that of the higher load-side bearing half 9.

In a further modified form of the invention shown in FIG. 13(c), an overlay layer 26 is formed on a higher load-side bearing half 9 to extend circumferentially over a predetermined angle, and is decreasing in thickness gradually from a central portion thereof toward opposite circumferential ends. A lower load-side bearing half 10 has the same construction as that of the higher load-side bearing half 9.

In the higher load-side bearing half 9, if the overlay layer is made of a resin material, the content of the solid lubricant may be constant at the region extending circumferentially from the central portion toward each of the opposite ends in the range of 30 to 70 degrees since this region (to which a particularly high load is applied) is expected to have the enhanced lubricating property, and at those regions disposed outwardly of this region, the content of the solid lubricant may be lower than that at the region extending in the range of 30 to 70 degrees, or any solid lubricant may not be contained, so that the overlay layer at these regions comprises only the resin.

The sliding bearing is not limited to the type in which the two bearing halves are assembled together, but it may be a preformed cylindrical bushing.

The present invention is not limited to the sliding bearings used in the engine of the automobile, but can be applied extensively to various sliding bearings.

What is claimed is:

1. A sliding bearing wherein a load, applied to a bearing alloy surface adapted in a cylindrical shape, varies in a circumferential direction;

wherein an overlay layer is formed on a portion of said bearing alloy surface to which a higher load is applied;

wherein a thickness of said higher load-side overlay layer decreases gradually from the central portion thereof toward both circumferential outward directions; and wherein said higher load-side overlay layer is made of a resin material containing a solid lubricant and a resin binder.

2. A sliding bearing according to claim 1, wherein said higher load-side overlay layer is made of a resin material containing a solid lubricant and a resin binder, and wherein the content of the solid lubricant in the resin material is the highest at the central portion and decreases gradually toward circumferentially outwardly from the central portion.

3. A sliding bearing according to claim 2, wherein said higher load-side overlay layer is made of a resin material containing a solid lubricant and a resin binder, and fine pits are formed on the surface of said overlay layer by a running-in.

4. A sliding bearing according to claim 1, wherein said higher load-side overlay layer is made of a resin material containing a solid lubricant and a resin binder, and fine pits are formed on the surface of said overlay layer by a running-in.

5. A sliding bearing comprising a backing metal, a bearing alloy layer, and an overlay, said sliding bearing having a circular-cylindrical shape and defining a higher load-side central portion, a lower load-side portion and transition zones therebetween;

said overlay layer having a thickness which is a maximum at said higher load-side and which gradually decreases toward said transition zones; and wherein said higher load-side overlay layer is made of a resin material containing a solid lubricant and a resin binder, and fine pits are formed on the surface of said overlay layer by a running-in.

6. A sliding bearing comprising a backing metal, a bearing alloy layer, and an overlay, said sliding bearing having a circular-cylindrical shape and defining a higher load-side central portion, a lower load-side portion and transition zones therebetween;

said overlay layer having a thickness which is a maximum at said higher load-side and which gradually decreases toward said transition zones;

wherein a region of formation of said higher load-side overlay layer extends circumferentially from the central portion toward each of the both circumferential directions in an angle range of 30 to 80 degrees so that said region includes a main load-supporting portion to which a highest load is supplied; and wherein said higher load-side overlay layer is made of a resin material containing a solid lubricant and a resin binder.

7. A sliding bearing comprising a backing metal, a bearing alloy layer, and an overlay,
   said sliding bearing having a circular-cylindrical shape and defining a higher load-side central portion, a lower load-side portion and transition zones therebetween;
   said overlay layer having a thickness which is a maximum at said higher load-side and which gradually decreases toward said transition zones;
   wherein a region of formation of said higher load-side overlay layer extends circumferentially from the central portion toward each of the both circumferential directions in an angle range of 30 to 80 degrees so that said region includes a main load-supporting portion to which a highest load is supplied; and
   wherein said higher load-side overlay layer is made of a resin material containing a solid lubricant and a resin binder, and fine pits are formed on the surface of said overlay layer by a running-in.

* * * * *